United States Patent
Sethna (10) Patent No.: US 8,050,950 B2
(45) Date of Patent: Nov. 1, 2011

(54) SYSTEM AND METHOD FOR BOARDING PASSENGERS BASED ON BIDS

(76) Inventor: Shaun Beheruz Sethna, Atlanta, GA (US)

( * ) Notice: Subject to any disclaimer, the term of this patent is extended or adjusted under 35 U.S.C. 154(b) by 428 days.

(21) Appl. No.: 12/221,734

(22) Filed: Aug. 6, 2008

(65) Prior Publication Data
US 2010/0036688 A1 Feb. 11, 2010

(51) Int. Cl.
*G06Q 10/00* (2006.01)
*G06Q 50/00* (2006.01)
(52) U.S. Cl. .................................. 705/6; 705/5
(58) Field of Classification Search ............... 705/5, 6, 705/2, 37; 700/83
See application file for complete search history.

(56) References Cited

U.S. PATENT DOCUMENTS

| | | | |
|---|---|---|---|
| 6,112,185 A * | 8/2000 | Walker et al. ................. | 705/5 |
| 7,246,072 B2 * | 7/2007 | Walker et al. ................. | 705/5 |
| 7,406,467 B1 * | 7/2008 | White ........................... | 1/1 |
| 2002/0022896 A1 * | 2/2002 | Dugan ........................... | 700/83 |
| 2002/0023041 A1 * | 2/2002 | Brett ............................. | 705/37 |
| 2003/0101146 A1 * | 5/2003 | Yeo et al. ..................... | 705/400 |
| 2005/0096962 A1 * | 5/2005 | Narasimhan et al. ........ | 705/9 |
| 2005/0182660 A1 * | 8/2005 | Henley ......................... | 705/2 |
| 2005/0267787 A1 * | 12/2005 | Rose et al. ................... | 705/5 |
| 2007/0043598 A1 * | 2/2007 | Bertram et al. .............. | 705/5 |
| 2007/0165608 A1 * | 7/2007 | Altberg et al. ............... | 370/352 |
| 2007/0185745 A1 * | 8/2007 | Schukraft ..................... | 705/5 |

OTHER PUBLICATIONS

"Standby Air Travel" Published by www.wikipedia.org on Apr. 2, 2008 (pp. 1-3).*
"Flying Standby" Published by www.everthing2.com on Aug. 5, 2003 (pp. 1-4).*
"How to Fly Standby" Published by www.ehow.com on Dec. 25, 2007 (pp. 1-3).*

* cited by examiner

*Primary Examiner* — Igor Borissov
*Assistant Examiner* — Brian Epstein (57) ABSTRACT

Systems and methods for boarding passengers on flights or other transportation according to bids received from the passengers are provided. Passengers seeking to fly standby on an undersold flight can submit a bid representing the amount the passengers are willing to pay to board the flight. The airline can determine the number of seats available on the flight, and board the highest bidding passengers until the flight is full. Similarly, passengers willing to be bumped from an oversold flight can submit a bid representing the incentive the passengers are willing to accept to be bumped from the flight. The airline can determine the number of passengers that must be bumped from the flight, and bump the lowest bidding passengers (i.e., those willing to accept the least costly incentive) until a sufficient number of passengers have been bumped from the flight.

20 Claims, 6 Drawing Sheets

SYSTEM AND METHOD FOR BOARDING PASSENGERS BASED ON BIDS

TECHNICAL FIELD

The invention relates to systems and methods for receiving bids from passengers and boarding passengers based on those bids. More particularly, the invention relates to receiving bids from passengers—such as airline passengers—seeking to travel standby or willing to be "bumped" from their reserved seat and selecting which passengers to board based on those bids.

BACKGROUND

Airlines and other transportation carriers generally seek to maximize the number of passengers on each flight. Empty seats can represent lost revenue, and the marginal cost incurred by an airline by boarding an extra passenger is relatively small. Thus, minimizing the number of empty seats on a flight can maximize the profit for the airline.

Because of the lost revenue associated with empty seats on a given flight, airlines generally sell a greater number of tickets for a flight than there are total seats. The airlines assume that at least a portion of the tickets will go unused, and therefore overselling can help the airline minimize the number of empty seats on each flight.

Except in the rare case where an airline will successfully oversell a flight by the precisely correct number of seats, as flights approach their departure time there are generally either too many or too few passengers ready to board the flight. For example, if the airline oversold the flight, and in doing so, overestimated the number of passengers that would cancel their reservation, the flight is considered overbooked or oversold. In such cases, certain passengers, even though they may have boarding passes for the flight, may be asked to give up their seats on the flight and board a different flight to their destination, otherwise known as "bumping" the passenger from their original flight.

In other cases, flights may be underbooked or undersold. This may be because the airline oversold the flight but underestimated the number of passengers that would cancel their reservation. Alternatively, the airline may not have oversold the flight in the first place. Regardless of the reason, when a given flight is undersold, the airline may allow other passengers to board the flight, even if they did not have a ticket for the flight. Often times, these so-called passengers may have a ticket for a later flight to the same destination on the same airline, but have arrived in time to catch the earlier flight and seek to fly standby on the earlier flight. These standby passengers can board the earlier flight and give up their seat on the later flight. This can be advantageous to the airline because it reduces the number of empty seats on the earlier flight, and allows the airline additional time to replace the passenger's seat on the later flight.

Conventional policies for boarding standby passengers on undersold flights and "bumping" passengers from oversold flights can vary. For example, conventional airlines often charge a fee to standby passengers, in an attempt to capture extra revenue from passengers seeking to change their flight. Conversely, when determining which passengers to bump from oversold flights, airlines often provide a voucher or other financial incentive to passengers willing to give up their seats in exchange for seats on a later flight.

These conventional policies and methods for charging fees to standby passengers and providing financial incentives to those passengers willing to give up their seats both pose certain problems for airlines. For example, airlines charging fees for standby passengers often struggle to determine the optimal standby fee. They often must use principles of supply and demand to set a fee sufficiently high to generate significant revenue, but not so high to deter a significant number of passengers from flying standby. This optimal fee can be difficult to estimate, and any fee other than the optimal fee can result in lost profits. Furthermore, setting one optimal—or even near optimal—fee for all flights can be impossible, given that different flights of an airline may have vastly different passenger demands based on a variety of factors such as the routes, time of year, and time of departure for the flight.

With respect to incentivizing passengers willing to be bumped from their flights, airline policies generally involve offering a certain incentive to passengers to exchange their seat for a later flight, and repeatedly increasing the incentive until a sufficient number of passengers have given up their seats. According to conventional airline policies, all bumped passengers may receive the identical incentives, equal to the latest (and highest) amount offered by the airline. Thus, under the conventional model, some passengers may receive a greater financial incentive than what they would be willing to accept to give up their seats, thus representing an extra cost to the airline.

Another deficiency with the conventional model for providing financial incentives to bumped passengers is that the airline generally announces the type and amount of financial incentive and the number of seats by which the flight has been oversold. This often occurs at the departure gate for the flight, with willing passengers approaching the airline staff to accept a given financial incentive. This model can allow passengers to see how many seats are needed, and how many passengers have given up their seats. Passengers thus can try to "game" the system, by waiting for the incentive to increase until it seems that almost enough passengers have given up their seats before giving up theirs, even if they would have been willing to take a lower financial incentive to do so. This behavior, allowed by the conventional model, also can result in increased cost to the airline.

Thus, a need in the art exists for a system and method for determining which standby passengers to board an undersold flight and for determining which passengers to bump from an oversold flight that lacks the deficiencies associated with conventional models. Specifically, a need in the art exists for a method for determining which standby passengers to board a flight that reduces or eliminates the need for an airline to determine a set standby fee to charge passengers. A need in the art also exists for a method for determining which standby passengers to board a flight that increases the airline's profits by accounting for the different supply and demand for standby seats on different flights. Another need in the art exists for a method for determining which passengers to bump from an oversold flight that reduces the extra costs to the airline associated with providing each bumped passenger with the same financial incentive. Yet another need in the art exists for a method for determining which passengers to bump from an oversold flight that reduces the costs associated with passengers knowing the financial incentives that other passengers are willing to accept to be bumped from the flight.

SUMMARY OF THE INVENTION

The invention described herein can provide a system and method for seating passengers on oversold and undersold flights or other transportation that address the deficiencies in the prior art. Specifically, the inventions can receive bids from ticketed or potential passengers, and determine which of those passengers to board on a flight based on those bids.

In one aspect, the invention can provide a system and method for receiving bids from passengers seeking to fly standby on an undersold flight, and determining which of those passengers to board on the flight. After determining that a flight has been undersold (i.e., that empty seats would remain after boarding all ticketed passengers), the airline can announce to standby passengers that seats are available on the flight. The airline can invite interested standby passengers to submit a bid, representing the amount of money that the passengers would be willing to pay to be seated on the flight.

After receiving bids from the standby passengers, the airline can determine how many seats are available on the flight. The airline then can select the highest bid, board the passenger who submitted the highest bid, and continue boarding passengers in descending order of the bid they submitted until the flight is full. For example, if there are forty total seats on a flight and there are thirty ticketed passengers, the airline can board the standby passengers who submitted the ten highest bids.

Boarding standby passengers according to the bids they submitted can increase the revenue and/or profits to the airline when compared to conventional systems and methods. By allowing each standby passenger to submit a bid, the need for the airline to set a predetermined standby fee is removed. Such a system therefore can reduce or remove the problems of setting a standby fee too low (thereby forgoing revenue on high demand flights where passengers would be willing to pay more than the standby fee) or too high (thereby forgoing revenue on lower demand flights where passengers would be willing to pay less than the standby fee). Receiving bids from the passengers can automatically adjust the standby fees charged to the passengers for the relative supply and demand for a given flight. Only the highest bidding passengers will obtain seats on high demand flights. Conversely, on lower demand flights where many seats are available, more seats may be filled with standby passengers as long as they are willing to bid on the seats, even if some passengers bid less than a conventional airline's standby fee.

In another aspect, the invention can provide a system and method for receiving bids from ticketed passengers on an oversold flight, and determining which of those passengers to move or bump from the flight based on the passengers' bids. After determining that an airline's flight is oversold, the airline can announce to the passengers of the flight that it is oversold, and that passengers may volunteer to be bumped from the flight. The airline can invite interested passengers to submit a bid, representing the incentive that the passenger would accept to be bumped from the flight. The bids received by the passengers can include a monetary reward, such as a cash payment or a voucher to use on future travel for the airline. The bid also can include a request for a replacement seat on a specific later flight to the passenger's destination.

After receiving the bids from the passengers, the airline can determine how many passengers it needs to bump from the flight by subtracting the total number of seats on the flight from the number of ticketed passengers for the flight. The airline then can sort the bids according to the value of the bids. The airline then can select the lowest bid, bump the passenger who submitted the lowest bid, and provide the appropriate incentive to the bumped passenger. Providing the incentive to the bumped passenger can include paying the passenger the value of the passenger's bid, as well as providing a confirmed ticket and/or boarding pass for the specific later flight selected by the passenger. The airline then can continue bumping passengers and providing appropriate incentives to the bumped passengers in ascending order of the bid they submitted until a sufficient number of passengers have been bumped from the flight.

Bumping passengers according to the bids they submitted can reduce the costs and/or increase the profits to the airline when compared to conventional systems and methods. By allowing ticketed passengers to submit a bid corresponding to the incentive they would accept to be bumped from the oversold flight, the need for the airline to announce a incentive and gradually increase the incentive until a sufficient number of passengers have been bumped is removed. Such a system therefore can reduce or remove the problem of rewarding an identical incentive to all bumped passenger, and instead can provide each passenger the minimum incentive that the passenger is willing to accept.

Bids from ticketed passengers willing to be bumped from a flight, as well as bids from standby passengers seeking to board a flight, can be received by the airline in secret, such that passengers may not be aware of other passenger's bids. Additionally, when an airline announces to the passengers that seats are available for standby bidding, the airline may not announce to the passengers the number of seats standby seats available. Similarly, when an airline announces that a flight is oversold, the airline may not announce to the number of passengers that need to be bumped from the flight. By not announcing the number of seats in these situations, passengers may be more likely to submit an accurate bid, rather than hoping to "game" the system. For example, if a passenger seeking to fly standby knows that the desired flight has a relatively large number of seats available, the passenger may submit a bid lower than what the passenger is truly willing to pay, hoping that the passenger would nonetheless be able to secure one of the available seats. Similarly, if a passenger on an oversold flight knows that the airline needs to bump a relatively large number of passengers from the flight, the passenger may submit a bid higher than what the passenger is truly willing to accept. If the same passenger did not know the number of seats available, the passenger may be more inclined to submit the true bid, to improve the chances of obtaining a seat.

These and other aspects, objects, and features of the present invention will become apparent from the following detailed description of the exemplary embodiments, read in conjunction with, and reference to, the accompanying drawings.

DETAILED DESCRIPTION OF THE
EXEMPLARY EMBODIMENTS

The invention enables airlines or other transportation providers to receive bids from ticketed or standby passengers, and to use those bids to determine which passengers to board on an oversold or undersold flight (or other similar transportation vehicles). A method and system for receiving bids from passengers and determining which passengers to board a flight will now be described with reference to FIGS. 1-6, which depict representative or illustrative embodiments of the invention.

Figure 1:
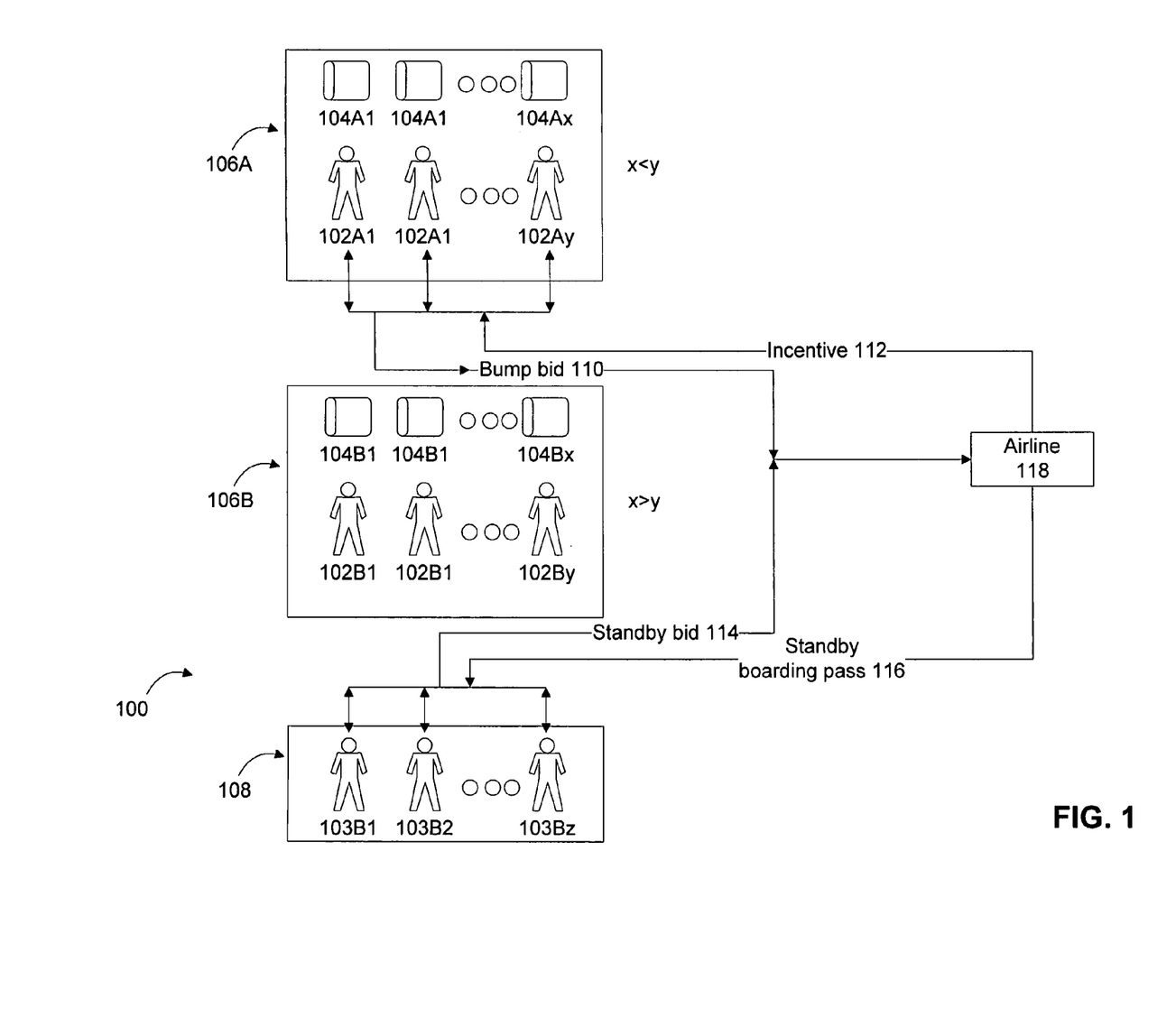
FIG. 1 is a block diagram depicting a system for receiving bids from passengers seeking to fly standby on an undersold flight and from passengers willing to be bumped from an oversold flight, according to an exemplary embodiment of the invention.

FIG. 1 is a diagram depicting components of a system 100 for receiving bids from passengers 102, 103B according to an exemplary embodiment of the invention. The exemplary system 100 depicted in FIG. 1 includes an airline 118 with two exemplary flights: an oversold flight 106A and an undersold flight 106B. Each flight 106A, 106B includes a number of total seats 104A, 104B, and a number of passengers 102A, 102B with a confirmed seat or checked in for the flights 106A, 106B. In the oversold flight 106A, the number of passengers 102A exceeds the number of seats 104A on the flight 106A. In the undersold flight 106B, the number of seats 104B exceeds the number of passengers 102B. FIG. 1 additionally depicts a standby list 108 including standby passengers 103B desiring to board the undersold flight 106B.

The exemplary system 100 further depicts communication of a bump bid 110 from passengers 102A on the oversold flight 106A to the airline 118, and communication of a standby bid 114 from the passengers 103B on the standby list 108 to the airline 118. FIG. 1 further depicts incentives 112 being provided to certain passengers 102A on the first flight 106A and standby boarding passes 116 being provided to certain passengers 103B on the standby list 108 for the second flight 106B. In accordance with exemplary embodiments, a portion of the passengers 102A on the oversold flight 106A may be bumped from the flight 106A, and a portion of the passengers 103B on the standby list 108 may be allowed to board the undersold flight 106B. The airline 118 can determine which passengers 102A to bump and which standby passengers 103B to board based on bump bids 110 and standby bids 114, respectively, received from the passengers 102A, 103B. The elements depicted in FIG. 1 will be discussed in more detail with reference to the methods illustrated in FIGS. 2-6.

Figure 2:
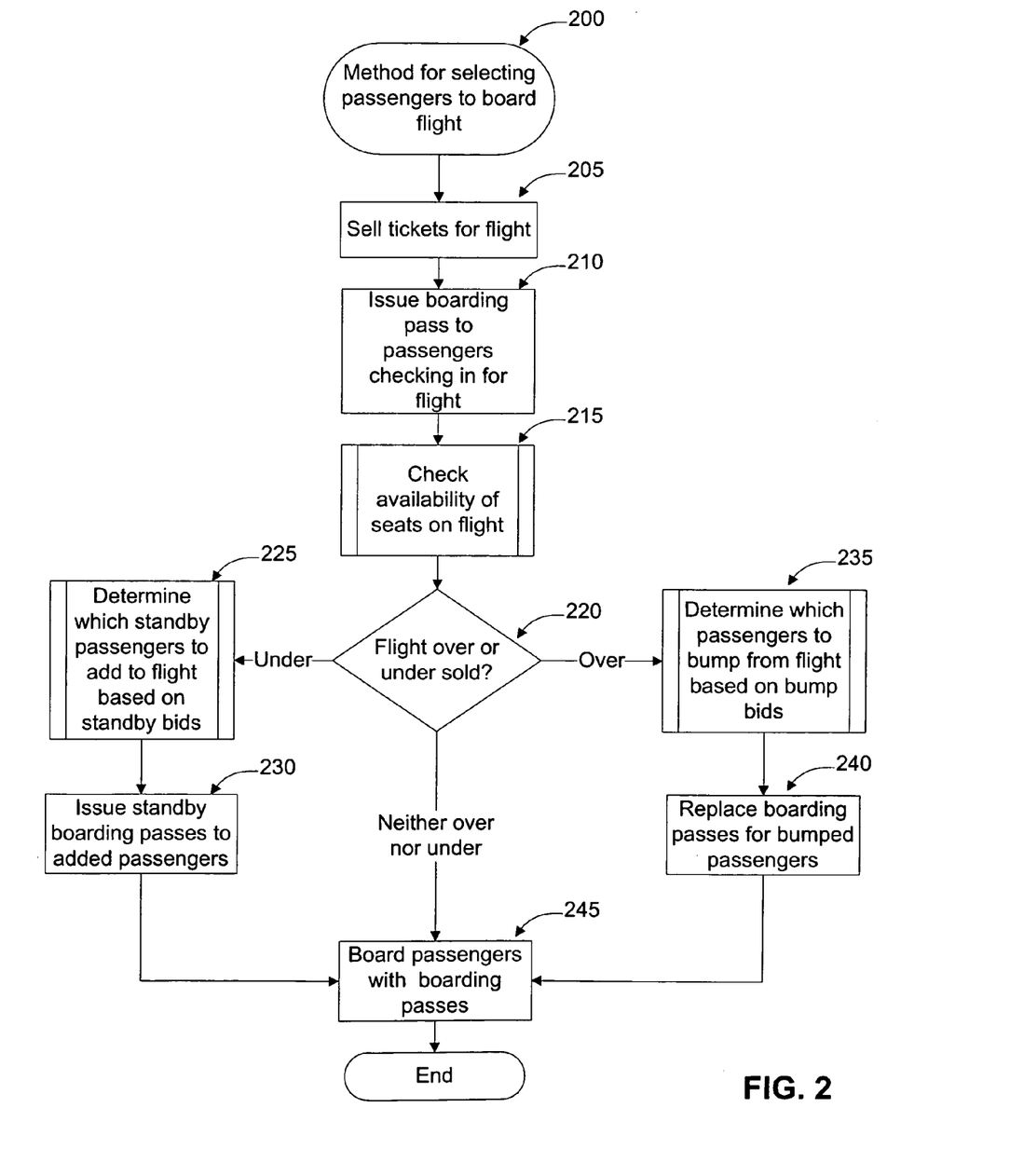
FIG. 2 is a flow chart depicting a method for selecting passengers to board a flight, according to an exemplary embodiment of the invention.

FIG. 2 is a flow chart depicting a method 200 for selecting passengers 102, 103B to board a flight 106, according to an exemplary embodiment of the invention. In step 205, the airline 118 sells tickets to the flight 106. The airline 118 can sell tickets to the flight 106 according to various exemplary methods known to one of ordinary skill in the art having the benefit of the present disclosure. For example, the airline 118 can sell tickets to the flight 106 via the Internet, such as through the airline's 118 website. Alternatively, or additionally, the airline 118 can sell tickets to the flight 106 at kiosks, over the phone, in or near an airport, or at a physical office of the airline 118.

Regardless of the particular method for selling tickets, the tickets sold by the airline 118 can be electronic or physical. Additionally, the airline 118 can sell tickets to the flight 106 according to different fares or fare classes. For example, the airline 118 can sell both refundable and non-refundable tickets to the flight 106, with refundable tickets being more expensive. Additionally, the fare class of the ticket, and therefore the price of the ticket, may vary based on the time the ticket is purchased. For example, tickets may get more expensive as the date of the flight 106 approaches.

In step 210, the airline 118 issues boarding passes to passengers 102 checking in for the flight 106. These passengers 102 can be those passengers 102 who purchased tickets to the flight 106 in step 205. In various exemplary embodiments, the passengers 102 can check in for the flight 106 according to a variety of methods. These methods can include checking in on the airline's 118 website, at a kiosk at the airport, or with an airline 118 employee at a ticket counter.

In step 215, the airline 118 checks the availability of seats 104 on the flight 106. Checking the availability of seats 104 can include a comparison of the number of total seats 104 on the flight 106 and the number of passengers 102 who have checked in for the flight 106. Step 215 will be described in more detail with reference to FIG. 3.

In step 220, the airline 118 determines whether the flight 106 is oversold or undersold. In an exemplary embodiment, this determination can be based upon the availability of seats 104 determined in step 215. Thus, if the airline 118 determines that the flight 106B is undersold (i.e., that the number of passengers 102 checked in is less than the number of seats 104 on the flight 106B), the method 200 branches to step 225, where the airline 118 determines which standby passengers 103B to add to the flight 106B based on standby bids 114. However, if the airline 118 determines that the flight 106A is oversold, the method 200 branches to step 235, where the airline 118 determines which ticketed passengers 102A to bump from the flight 106A based on bump bids 110. FIG. 1 depicts an oversold flight 106A and an undersold flight 106B. If the airline 118 determines that the flight 106 is neither oversold nor undersold (i.e., that the number of passengers 102 checked in is equal to the number of seats 104 on the flight 106), then the method 200 branches to step 245, where the airline 118 boards passengers 102 with boarding passes.

In step 225, the airline 118 determines which standby passengers 103B to add to the flight 106B based on standby bids 114. In an exemplary embodiment, this determination can include receiving standby bids 114 from standby passengers 103B, and determining which standby passengers 103B to add to the flight 106B based on those standby bids 114. In an exemplary embodiment, as shown in FIG. 1, the airline 118 can maintain a standby list 108 of passengers 103B seeking to fly standby on the flight 106B.

In one embodiment, all available seats 104B can be assigned to standby passengers 103B based at least in part upon the standby bids 114. In an alternative embodiment, a portion of available seats 104B can be assigned to standby passengers 103B at least in part upon the standby bids 114, and the remainder of the available seats 104B can be assigned to standby passengers 103B by other methods, such as conventional methods or other methods known to one of ordinary skill in the art having the benefit of the present disclosure. Step 225 will be described in more detail with reference to FIG. 4.

In step 230, the airline 118 issues standby boarding passes 116 to the standby passengers 103B added to the flight 106B in step 225. In an exemplary embodiment, the standby boarding passes 116 issued to standby passengers 103B in step 230 can be equivalent to the boarding passes issued to ticketed passengers 102 in step 210, and therefore can entitle the standby passengers 103B with standby boarding passes 116 to a confirmed seat on the flight 106B. The method 200 then proceeds to step 245, where the airline 118 boards all passengers 102 with boarding passes, including those standby passengers 103B with standby boarding passes 116.

In step 235, the airline 118 determines which ticketed passengers 102A to bump from the flight 106A based on bump bids 110. In an exemplary embodiment, this determination can include receiving bump bids 110 from ticketed passengers 102A, and determining which ticketed passengers 102A to bump from the flight 106A based on those bump bids 110. In one embodiment, as described previously with respect to step 225, all bumped passengers 102A can be selected by the airline 118 based at least in part upon the bump bids 110. In an alternative embodiment, a portion of the bumped passengers 102A can be selected at least in part upon the bump bids 110, and the remainder of the bumped passengers 102A can be selected by other methods, such as conventional methods or other methods known to one of ordinary skill in the art having the benefit of the present disclosure. Step 235 will be described in more detail with reference to FIG. 6.

In step 240, the airline 118 replaces the boarding passes for the passengers 102A that the airline 118 determines to bump in step 235. In an exemplary embodiment, replacing the boarding passes can include taking the boarding pass from the bumped passenger 102A, and issuing a new boarding pass for a different flight 106 to the passenger 102A. The replacement boarding pass can be for a later flight 106 that was selected by the passenger 102A when the passenger 102A submitted its bump bid 110.

In step 245, the airline 118 boards all passengers 102, 103B with boarding passes for the flight 106. In an exemplary embodiment, where the flight 106A was oversold, the passengers 102 boarded on the flight 106A can include all passengers 102A who checked in for the flight 106A in step 210 whom the airline 118 did not bump from the flight 106A in step 235. In another exemplary embodiment, where the flight 106B was undersold, the passengers 102 boarded on the flight 106B can include all passengers 102B who checked in for the flight 106B in step 210, as well as those standby passengers 103B who obtained standby boarding passes 116 in step 230. After the passengers 102, 103B are boarded in step 245, the method 200 ends.

Figure 3:
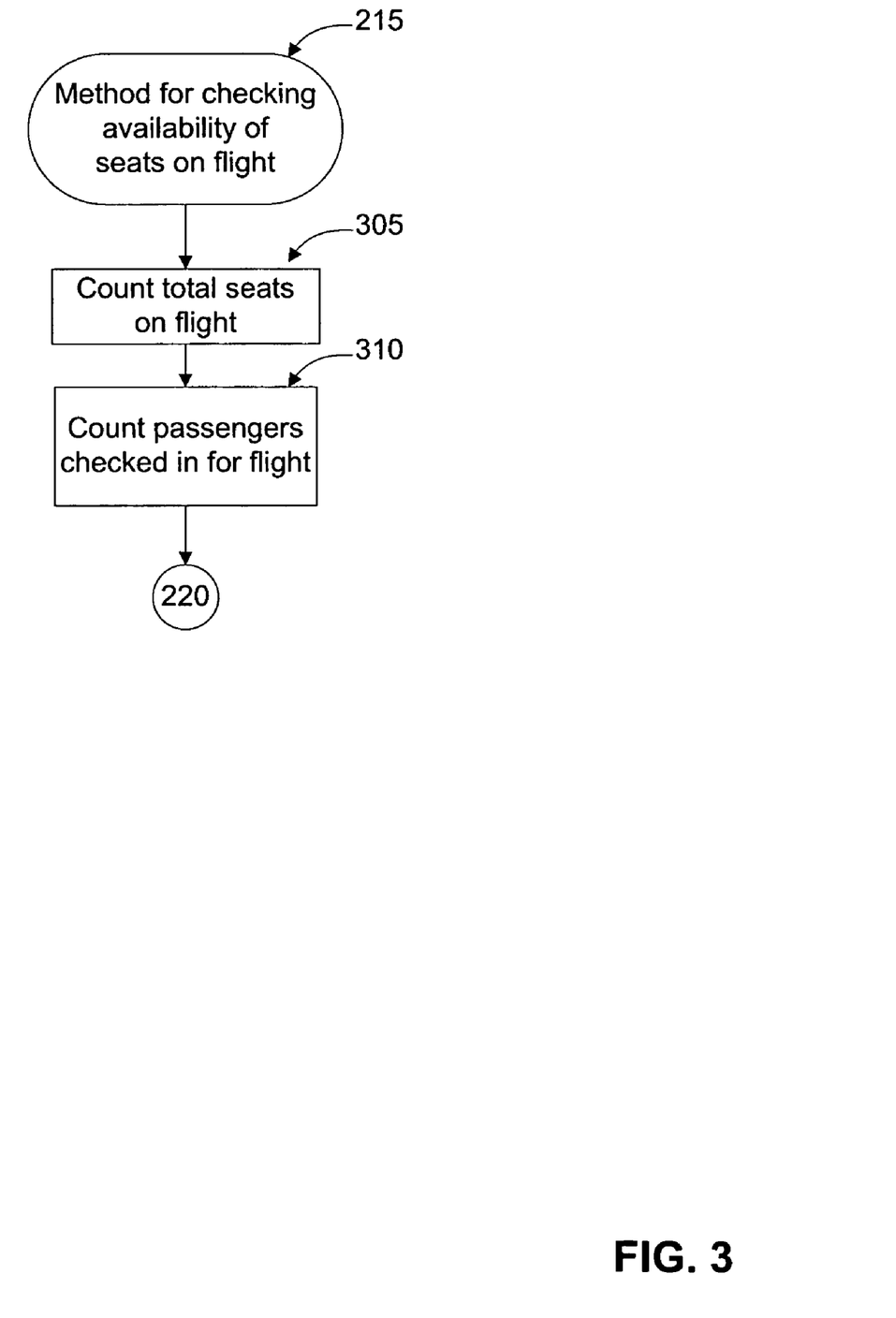
FIG. 3 is a flow chart depicting a method for checking the availability of seats on a flight, according to an exemplary embodiment of the invention.

FIG. 3 is a flow chart depicting a method 215 for checking the availability of seats 104 on a flight 106, according to an exemplary embodiment of the invention. In step 305, the total number of seats 104 on the flight 106 are counted. In one embodiment, the total number of seats 104 can be broken down by various sections. For example, the airline 118 can count the total number of first class, business class, and coach class seats 104 separately. In another embodiment, the airline 118 may store data for its airplane flights 106 that track the total number of seats 104 on a given flight 106. Thus, instead of explicitly counting the total seats 104, the total number of seats 104—whether or not broken down by class—can be retrieved from stored data.

In step 310, the number of passengers 102 that have checked in for a flight 106 are counted. In exemplary embodiments, the airline 118 can count the number of passengers 102 that have checked in for the flight 106 at various different times. For example, the airline 118 can count the number of checked-in passengers 102 a fixed amount of time before the flight 106 is scheduled to depart. In an exemplary embodiment, the airline 118 can count the number of checked-in passengers 102 multiple times, or alternatively, the airline 118 can use a server, computer, or other information processing unit to count the number of checked-in passengers 102 continuously. Additionally, as with counting the total number of seats 104 in step 305, the airline 118 count the number of checked-in passengers 102 separately by seat class. The method 215 then returns to step 220, as described previously with reference to FIG. 1.

Figure 4:
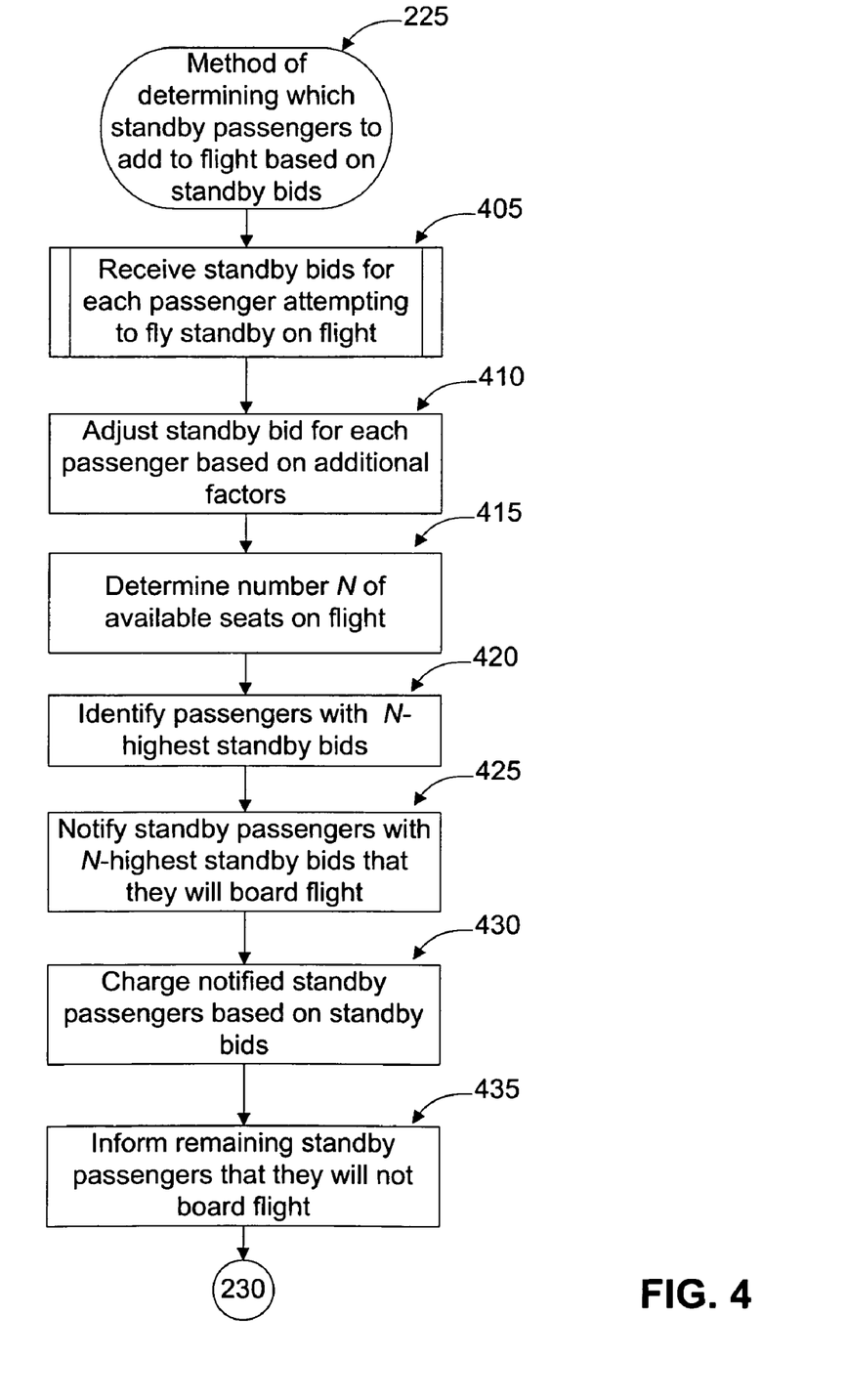
FIG. 4 is a flow chart depicting a method for determining which standby passengers to add to a flight based on standby bids, according to an exemplary embodiment of the invention.

FIG. 4 is a flow chart depicting a method 225 for determining which standby passengers 103B to add to a flight 106B based on standby bids 114, according to an exemplary embodiment of the invention. In step 405, the airline 118 receives the standby bids 114 for each passenger 103B attempting to fly standby on the flight 106B. In an alternative embodiment, as described previously, the airline 118 may receive standby bids 114 from only a portion of those passengers 103B attempting to fly standby on the flight 106B, as the airline 118 may only seat a portion of the standby passengers 103B according to a standby bid 114, and use other methods for determining which other passengers (not shown) to seat.

The set of passengers 103B that are seeking to fly standby on a given flight 106B can be determined by a variety of methods. Regardless of the method or methods used to determine the passengers 103B seeking to fly standby, the identity of the passengers 103B can be maintained on a standby list 108. The standby list 108 can be stored in a database that also stores a corresponding standby bid 114 for each passenger 103B on the standby list 108.

In certain embodiments, some standby passengers 103B may be traveling in groups, such as a family. In such cases, the group of passengers 103B may submit the same bid for each passenger 103B in the group. Alternatively, the group may submit one bid for the entire group of passengers 103B, in which case the airline 118, after receiving the bid, can divide the bid by the number of passengers 103B in the group so that the airline 118 can compare the bid to other bids received from individual passengers 103B. Additionally, a group of passengers 103B can indicate whether the group would be willing to travel even if they could not be seated together on the flight 106B. Step 405 will be described in more detail with reference to FIG. 5.

In step 410, the standby bid 114 received by each passenger 103B can be adjusted based on additional factors. In exemplary embodiments, a variety of additional factors can be used to adjust the standby bid 114 received by each passenger 103B in step 405. In one embodiment, the airline 118 can adjust a standby bid 114 entered by a passenger 103B based on the fare class of the passenger's 103B ticket. For example, if a passenger 103B purchased a full fare ticket rather than a discounted ticket, the passenger's 103B standby bid 114 may be increased by a certain percentage (e.g., 10%) or amount (e.g., $50). The increase in the bid need not affect the actual amount the passenger 103B would pay for the standby seat 104B if the passenger's 103B bid is eventually accepted. Rather, the increase in the bid can be an adjustment made by the airline 118 to provide a benefit to passengers 103B who pay for full fare tickets instead of discounted tickets.

Another factor that can be used to adjust a passenger's 103B bid is the frequent flier status of the passenger 103B. Many airlines 118 offer frequent flier programs to reward those passengers 102, 103B who repeatedly travel with the airline 118 or its partners. Some airlines 118 further provide different tiers of frequent flier status, such as providing a first level for occasional travelers, a second level for those traveling at an intermediate frequency, and a third level for those that travel very regularly. Thus, in one embodiment, an airline 118 can adjust a passenger's 103B bid based on the passenger's 103B status at a frequent flier, and the particular level of frequent flier status. For example, the bid of an occasional traveler who participates in an airline's 118 frequent flier program can be increased by a certain small percentage (e.g., 5%), while bids of intermediate and very regular travelers can be increased by greater percentages (e.g., 15% and 25%, respectively).

In another embodiment, the airline 118 can offer passengers 103B an option to pay a fee in advance in exchange for increasing their standby bid 114 by a given percentage, should the passenger 103B later attempt to fly standby. For example, an airline's 118 website that allows passengers 103B to purchase tickets on-line can include such an option during the purchasing process for passengers 103B. The same or similar options can be offered to a passenger 103B during the purchasing process—or at a different time—regardless of the purchasing method (e.g., kiosks, in-person, over the telephone) used. In a particular embodiment, an airline 118 can offer the passenger 103B the option to pay a variety of fees in exchange for increasing their standby bid 114 by a corresponding variety of amounts in the event the passenger 103B eventually seeks to exchange the seat 104 on the ticketed flight 106 to fly standby on a different flight 106B. For example, the airline 118 can offer the passenger 103B the option of paying an extra $10.00, $25.00, or $50.00 in return for increasing the passenger's 103B bid by 10%, 25%, or 50% respectively, in the event the passenger 103B submits a standby bid 114 for one or more flights 106B.

In another embodiment, the airline 118 can offer the passenger 103B the option to pay a one-time or recurring fee to increase all standby bids 114 the passenger 103B submits over a given time period. For example, the airline 118 can offer passengers 103B the option to pay a $100 fee in exchange for increasing the passenger's 103B standby fee by a fixed percentage for a one-year period.

In yet another embodiment, an airline 118 can adjust the standby bid 114 of a passenger 103B if the passenger 103B is seeking to fly standby on a flight 106B because the flight 106 for which the passenger 103B was ticketed was canceled by the airline 118, or if the passenger 103B missed the ticketed flight 106 due to a late connecting flight 106. Additionally, an airline 118 can adjust the standby bid 114 based on how long the passenger 103B has been attempting to board a standby flight 106B, whether in terms of the amount of time or in terms of the number of flights 106B on which the passenger 103B has attempted to fly standby.

In various other embodiments, a variety of behaviors that the airline 118 seeks to encourage can lead to an increase in a passenger's 103B bid. For example, an airline 118 can increase a standby bid 114 for a passenger 103B who purchased a ticket far in advance of the flight 106. Similarly, an airline 118 can increase a standby bid 114 for a passenger 103B who does not have check-in baggage, or alternatively, carry-on baggage. Other additional factors that can be used to adjust a standby bid 114, including those based on behaviors that the airline 118 may want to encourage, can be determined by one of ordinary skill in the art having the benefit of the present disclosure.

Additionally, although each of the foregoing examples for adjusting a standby bid 114 relate to increasing the bid, decreasing a bid under reverse circumstances (e.g., decreasing a bid for purchasing a discounted ticket) is also possible. However, given that the standby bids 114 may be adjusted only internally to help the airline 118 organize the list 108 of standby passengers 103B, rather than the actual standby bids 114 that the standby passengers 103B would pay being affected, decreasing the bids instead of increasing them may not have any practical effect.

Moreover, the airline 118 can determine whether or not to indicate to the passenger 103B the "adjusted" value of the passenger's 103B standby bid 114. In one embodiment, the airline 118 may determine that providing the adjusted value of the standby bid 114 to the passenger 103B can allow passengers 103B to submit a well informed bid, and therefore choose to provide this information. Alternatively, the airline 118 may believe that providing the adjusted value of the standby bid 114 to the passenger 103B may prevent the passenger 103B from entering the maximum value that the passenger 103B would be willing to pay, and therefore decline to provide this information.

In step 415, a number N corresponding to the number of available seats 104B on the flight 106B is determined. This can be accomplished by subtracting the number of checked-in passengers 102 from the total number of seats 104 on the flight 106B. In an exemplary embodiment, different flight classes (e.g., first, business, and coach) can have a separate corresponding number N, and as such, the bidding process and seating process for standby passengers 103B can be performed separately by flight class.

In step 420, the N-highest standby bids 114 are identified. In an exemplary embodiment, the N-highest bids can be identified based on the values for the bids as adjusted in step 410. Identifying the N-highest bids can include sorting all bids received by the airline 118 in descending order, selecting the highest bid, and then continuing to select each next highest bid until N bids have been selected.

In an exemplary embodiment, the airline 118 can take into account groups traveling standby together in identifying the N-highest bids. For example, if there are five available seats 104B (i.e., N=5), and the two highest bidders have been identified so only three seats 104B are available, a family of four passengers 103B each having the next highest bid may not be identified as the next highest bidders, since there are not sufficient seats for all members of the family. Then, an individual passenger 103B (or smaller group of passengers 103B) with the next highest bid after the family's bid can be identified. In an alternative embodiment, a family or other group in such a position can indicate whether a subset of the family or group is willing to board the flight 106B.

In step 425, the standby passengers 103B with the N-highest bids (i.e., those passengers 103B identified in step 420) are notified that they may board the flight 106B. In exemplary embodiments, these passengers 103B can be informed via an audio and/or video announcement that they have been selected to board the flight 106B.

In step 430, the standby passengers 103B notified in step 425 are charged an amount equal to their standby bid 114. As described previously, the amount charged may not be the adjusted standby bid 114 determined in step 410, but rather the standby bid 114 received by the airline 118 in step 405. In an exemplary embodiment, the notified passengers 103B can provide a credit card or other form of payment to the airline 118 to pay for their standby bids 114 after they are notified of their selection. In an alternative embodiment, passengers 103B can provide a credit card or other form of payment to the airline 118 when they submit their standby bids 114, and then the airline 118 can charge the credit card only if and when their standby bids 114 are selected. In yet another embodiment, the airline 118 can charge a credit card that the passenger 103B originally used to purchase the ticket for the flight 106B to pay for the standby bid 114.

In step 435, the airline 118 notifies the remaining standby passengers 103B (i.e., those that were not notified in step 425) that they will not board the flight 106B. These passengers 103B may not be charged by the airline 118. In one embodiment, these passengers 103B can be automatically transferred to the standby list 108 for the next flight 106 to the same destination. In a particular embodiment, the standby bids 114 for each of these passengers 103B that were received by the airline 118 in step 405 also can be transferred to the next flight's 106 standby list 108. In an alternative embodiment, these passengers 103B can be given the opportunity to enter a new standby bid 114 for the new flight 106B. After step 435, the method 225 proceeds to step 230, as referenced in FIG. 2.

Figure 5:
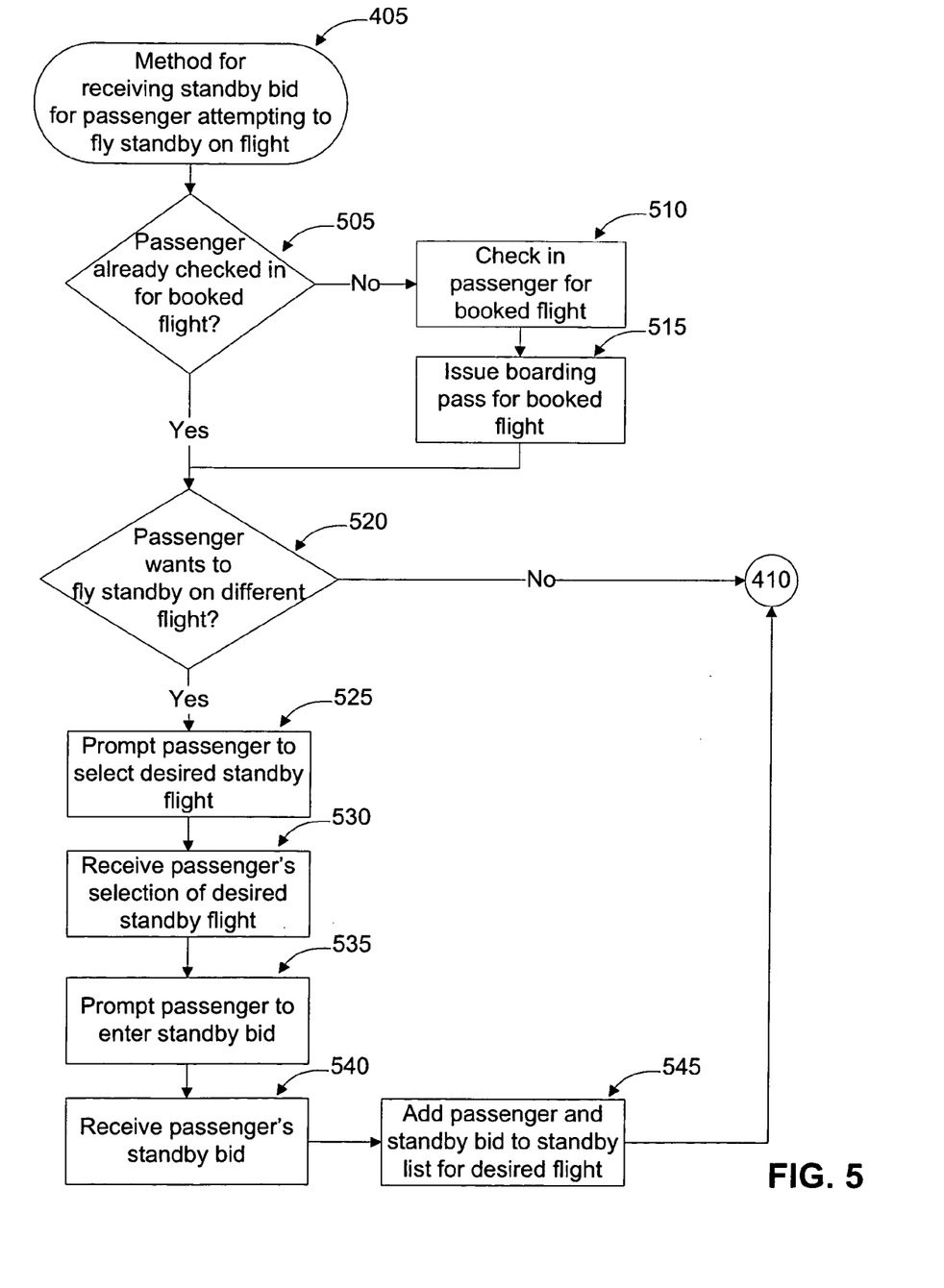
FIG. 5 is a flow chart depicting a method for receiving a standby bid for a passenger seeking to fly standby on a flight, according to an exemplary embodiment of the invention.

FIG. 5 is a flow chart depicting a method 405 for receiving a standby bid 114 for a passenger 103B seeking to fly standby on a flight 106B, according to an exemplary embodiment of the invention. In step 505, the method 405 determines whether the passenger 103B has already checked in for the passenger's 103B booked flight 106. The booked flight 106 can refer any flight 106 for which the passenger 103B has a confirmed seat 104, ticket, or boarding pass. If the passenger 103B has already checked in, the method 405 branches to step 510. If the passenger 103B has not already checked in, then the method 405 branches to step 520. In an alternative embodiment, the passenger 103B seeking to fly standby on a flight 106B may not already have a confirmed seat 104, ticket, or boarding pass for a given flight 106. For example, an airline 118 can have a policy or promotion that allows certain passengers 103B to fly standby without having a confirmed seat 104. In such an embodiment, the method 405 can proceed directly to step 525, where the passenger 103B is prompted to select the desired standby flight 106B.

In step 510, the passenger 103B is checked in for the booked flight 106. Various methods exist for checking in a passenger 103B for a flight 106. Passengers 103B can be checked in, for example, via the airline's 118 website, via a kiosk, or in person at a ticket counter. Other suitable methods of checking in passengers 103B can be used as well.

In step 515, a boarding pass is issued to the passenger 103B. The boarding pass can correspond to the flight 106 for which the passenger 103B checked in during step 510. In an exemplary embodiment, once a boarding pass is issued to a passenger 103B in step 515, the airline 118 can update its count of checked-in passengers 103B and available seats 104 as described previously with reference to step 215. The method 405 then proceeds to step 520.

In step 520, the method 405 determines whether a passenger 103B wants to fly standby on a different flight 106B (i.e., a flight 106B other than the one for which the passenger 103B has checked in). If the passenger 103B wants to fly standby on a different flight 106B, the method 405 branches to step 525. Otherwise, the method 405 proceeds to step 410, as referenced in FIG. 4.

In various embodiments, the passenger 103B can indicate a desire to fly standby on a different flight 106B in a variety of ways. For example, the passenger 103B can use the airline's 118 website to indicate a desire to fly standby on another flight 106B. Alternatively, the passenger 103B can use a kiosk at the airport, or indicate to an airline 118 employee—whether at a ticket counter, or to an employee at the departure gate for the desired standby flight 106B—that the passenger 103B would like to be added to a standby list 108 for a different flight 106B.

In an alternative embodiment, the airline 118 can determine whether a passenger 103B wants to fly standby before the passenger 103B has checked in for a flight 106, or during the check-in process. For example, in one embodiment, a passenger 103B can check in for a flight 106 using the airline's 118 website or an airline 118 kiosk, and during the check-in process, the passenger 103B can be prompted to indicate whether the passenger 103B wants to be added to the standby list 108 for a given flight 106B.

In step 525, the passenger 103B is prompted to select the desired standby flight 106B. In one embodiment, the passenger 103B can be prompted to enter this selection immediately after indicating a desire to fly standby. Additionally, to facilitate the passenger's 103B entry of this selection, the airline 118 can provide to the passenger 103B a list of flights 106 to the passenger's 103B desired destination. Such a list can include only those flights 106B where there is at least one seat 104B available. Then, in step 530, the passenger's 103B selection of the desired standby flight 106B is received by the airline 118.

In step 535, the passenger 103B is prompted to enter a standby bid 114. The standby bid 114 can represent the maximum amount that the passenger 103B is willing to pay to be able to fly on the desired flight 106B. In one embodiment, the passenger 103B can be prompted to enter this selection immediately after selecting the desired standby flight 106B in step 525. Then, in step 540, the passenger's 103B entry of the standby bid 114 is received by the airline 118.

The steps 520 through 535 can be performed in a variety of ways and by utilizing a variety of interfaces. Additionally, the steps can be performed at a variety of times—such as during the check-in process, or after the check-in process. For example, in some embodiments, where the passenger 103B checks in for a ticketed flight 106 using the airline's 118 website or kiosk, the airline 118 can perform steps 520 through 535 using the website or kiosk.

Alternatively, where the airline 118 performs steps 520 through 535 after the check-in process, the airline 118 can provide a separate website interface or kiosk for interfacing with the passenger 103B. An exemplary kiosk can be located at or near the departure gate for each flight 106. Additionally, an exemplary website interface for interacting with a passenger 103B in performing steps 520 through 535 can be specially configured for mobile or handheld Internet devices. Thus, passengers 103B who have already checked in for a flight 106, and may be seated in an airport terminal near the departure gate for another flight 106B on which they may desire to fly standby can use a mobile Internet device to access the airline's 118 website, which can receive a passenger's 103B indication of a desire to fly standby on a particular flight 106B, as well as the passenger's 103B standby bid 114 for the flight 106B.

In another embodiment, the airline 118 can provide an interface with a passenger 103B for performing steps 520 through 535 via electronic mail, text messaging, or other similar messaging interface. For example, a passenger 103B can send an email or text message to a specific address that includes information that can allow the airline 118 to perform steps 520 through 535. In an exemplary embodiment, a passenger 103B can send an email or text message to an address provided by the airline 118 that indicates the desired flight 106B and the passenger's 103B standby bid 114 for the flight 106B. In one embodiment, the message also can include an identification of the passenger 103B, such as the passenger's 103B ticket number or confirmation number. Alternatively, the identification of the passenger 103B can include the telephone number or email address from which the passenger 103B sent the message. If the passenger 103B is part of a family or group, as described previously, the passenger's 103B message can include an identification of the other passengers 103B within the group, as well as an indication of whether the group is willing to fly without sitting next to each other. Other interfaces for interacting with a passenger 103B in performing steps 520 through 535, such as an automated telephone system, may be recognized by one of ordinary skill in the art and can be utilized as appropriate. Additionally, an airline 118 can utilize a combination of two or more of the foregoing interfaces to perform steps 520 through 535.

Regardless of the interfaces used by the airline 118 to perform steps 520 through 535, the airline 118 can choose the amount of information regarding the standby list 108 to share with passengers 103B seeking to fly standby on a given flight 106B. For example, the airline 118 can announce the number of available seats 104B on a flight 106B to passengers 103B within proximity of the flight's 106B departure gate. For flights 106B on which only a few seats 104B are available, providing such information may encourage passengers 103B to enter a high bid to improve their chances of securing a seat 104B on the flight 106B. Alternatively, especially in cases where there may be many available seats 104B on a fight, the airline 118 may not share the number of available seats 104B with potential passengers 103B, because such information may encourage passengers 103B to enter a lower standby bid 114 than they would truly be willing to spend to board the flight 106B.

Additionally, the airline 118 can choose to keep all passengers' 103B bids hidden from other passengers 103B. Not sharing this information also can encourage passengers 103B to enter a standby bid 114 equal to the maximum amount they are willing to spend, rather than entering a standby bid 114 minimally above another passenger's 103B standby bid 114. Alternatively, if the airline 118 believes that sharing passengers' 103B bids with other passengers 103B may increase competitive bidding between passengers 103B, thereby driving standby bids 114 upward, the airline 118 can display (or otherwise provide to passengers 103B) a list of the top passengers' 103B standby bids 114 to other passengers 103B.

Moreover, the airline 118 also can choose whether to allow passengers 103B to submit only one standby bid 114, or instead, to allow passengers 103B to edit or adjust the standby bid 114, or to submit a subsequent standby bid 114. In one embodiment, the airline 118 can permit passengers 103B only to submit one standby bid 114 per flight 106B. This can encourage passengers 103B to submit their true, maximum standby bid 114, rather than to attempt to enter a lower bid with hopes of increasing the standby bid 114 should the passenger 103B later receive more information (such as learning that the flight 106B is nearly full) that suggests it may be difficult to receive a seat 104B on the flight 106B with a low standby bid 114.

In step 545, the passenger 103B and the passenger's 103B standby bid 114 are added to the standby list 108 for the desired flight 106B. After step 545, the method 405 proceeds to step 410, as referenced in FIG. 4.

Figure 6:
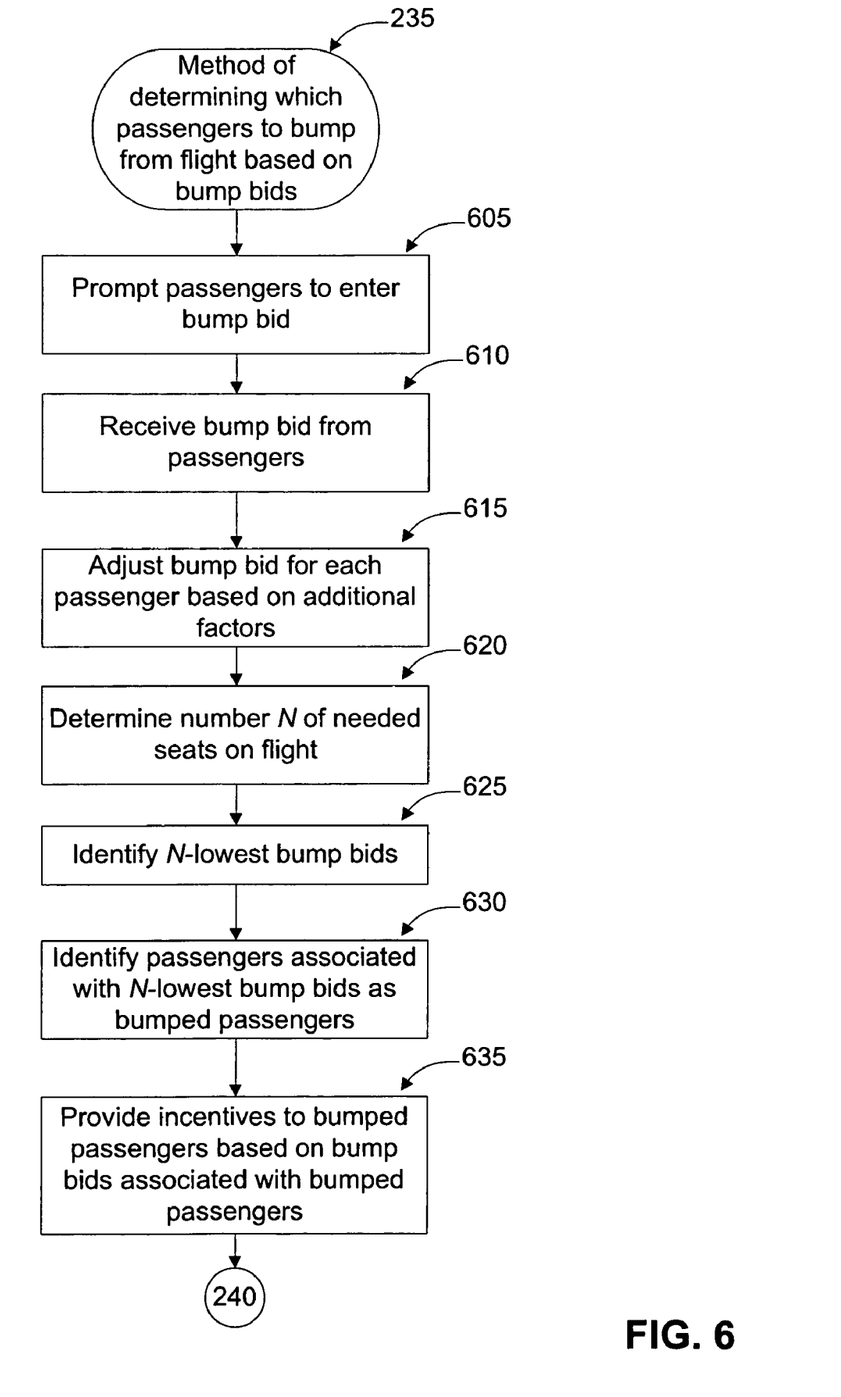
FIG. 6 is a flow chart depicting a method for determining which passengers to bump from a flight based on bump bids, according to an exemplary embodiment of the invention.

FIG. 6 is a flow chart depicting a method 235 for determining which passengers 102A to bump from a flight 106A based on bump bids 110, according to an exemplary embodiment of the invention. In step 605, the passengers 102A are prompted to enter a bump bid 110. In exemplary embodiments, the airline 118 can prompt passengers 102A to enter a bump bid 110 in a variety of ways. In one embodiment, the airline 118 can prompt passengers 102A by announcing (whether via an audio announcement, a video display, or other means) that the flight 106A has been oversold, and that any passengers 102A that have boarding passes or confirmed seats 104A on the flight 106A that are willing to be bumped from the flight 106A and instead board a later replacement flight 106 can submit a bump bid 110.

The bump bid 110 submitted by the passengers 102A can include a desired incentive 112 representing what each passenger 102A would be willing to accept in exchange for being bumped from the flight 106A. In one embodiment, the bump bid 110 can include the amount of money that the passenger 102A would be willing to accept. The amount of money can be in the form of a cash payment or an airline 118 voucher. In another embodiment, the bump bid 110 can include a number of frequent flier miles—or other non-monetary incentives 112—that would be added to the passenger's 102A account in exchange for being bumped from the flight 106A. In yet another embodiment, the bump bid 110 can include an offer to be bumped from the flight 106A in exchange for receiving an upgrade to another flight class (e.g., first class) on the passenger's 102A replacement flight 106.

Moreover, the bump bid 110 submitted by any passenger 102A can include a combination of one or more types of desired incentives 112. An exemplary bump bid 110 thus can include a monetary incentive 112, a request for frequent flier miles, and a request for a class upgrade on a replacement flight 106.

In one embodiment, the bump bids 110 can specify a particular incentive 112, and the bumped passengers 102A can be bumped to a replacement flight 106, such as the next flight 106 to the same destination. In another embodiment, the bump bids 110 can specify, along with the desired incentive 112, the desired replacement flight 106.

In step 610, the bump bids 110 the passengers 102A entered in step 605 are received. In an exemplary embodiment, after receiving the passengers' 102A bump bids 110, the airline 118 can standardize the bump bid 110 values. In other words, the airline 118 can determine the cost associated with providing each incentive 112 requested by the passengers' 102A bump bids 110. For example, the airline 118 can determine that a bump bid 110 that includes a request for 5,000 frequent flier miles can cost $150 to the airline 118, while a bump bid that includes a request for a $175 airline voucher can cost the airline 118 only $140. Similarly, the airline 118 can determine that seating a bumped passenger 102A on a popular replacement flight 106 may cost the airline 118 more than seating a bumped passenger 102A on a less popular flight 106. Thus, the particular replacement flight 106 selected by the passenger 102A also can affect the airline's 118 cost calculation and standardization. In one embodiment, the airline 118 can utilize a computer program or database that estimates or calculates the cost of each bump bid 110 (including the incentive 112 and the replacement flight 106) received from a passenger 102A.

In step 615, each passenger's 102A bump bid 110 is adjusted based on additional factors. As described previously with respect to adjusting standby bids 114 with reference to step 410 of FIG. 4, the airline 118 can use a variety of additional factors to adjust the bump bids 110. In various embodiments, the airline 118 can adjust bump bids 110—such as by decreasing the value of the bump bids 110—based on the fare class of the passenger's 102A ticket, the passenger's 102A frequent flier status, whether the passenger 102A has paid a one-time or recurring fee in return for having the bump bid 110 adjusted, or any other suitable factor. As described previously with reference to adjusting standby bids 114, the adjustment of the bump bids 110 may not affect the amount or type of the incentive 112 that the passenger 102A will actually receive if the passenger's 102A bump bid 110 is accepted. Rather, the adjustment may affect only how the passenger's 102A bump bid 110 is compared to other passenger's 102A bump bids 110.

In step 620, a number N corresponding to the number of needed seats 104A on the flight 106A is determined. This can be accomplished by subtracting the total number of seats 104A on the flight 106A from the number of checked-in passengers 102A.

In step 625, the N-lowest bump bids 110 are identified. In an exemplary embodiment, the N-lowest bump bids 110 can be identified based on the values for the bids as standardized, and then adjusted in step 615. Identifying the N-lowest bids can include sorting all bump bids 110 received by the airline 118 in ascending order, selecting the lowest bid, and then continuing to select each next lowest bid until N bids have been selected. As described previously with reference to standby bids 114, the airline 118 can take into account groups traveling together who submit bump bids 110. For example, if only three seats 104A are needed on a flight 106A, and a four-person family has submitted the lowest bump bid 110, the airline 118 can skip over that family and move to the next lowest bump bids 110. Alternatively, if the airline 118 determines that the four-person family's bid is so much lower than the next lowest bump bid 110 that the airline 118 would lose less revenue by paying the incentives 112 to the four-person family than by bumping three individual passengers 102A, the airline 118 can bump the four-person family and have an empty seat 104A. In a particular embodiment, the airline 118 then can fill the empty seat 104A with a standby passenger 103B, such as the standby passenger 103B with the highest standby bid 114.

In step 630, the passengers 102A with the N-lowest bids (i.e., the passengers 102A with the bump bids 110 identified in step 625) are notified that their bump bids 110 have been accepted and that they have been bumped from the flight 106A. In exemplary embodiments, these passengers 102A can be informed via an audio and/or video announcement that they have been bumped from the flight 106A.

In step 635, the passengers 102A notified in step 630 are provided with incentives 112 based on their bump bids 110. In an exemplary embodiment, the incentives 112 can be provided immediately, such as by crediting a cash reward to a credit card or other electronic account associated with the passenger 102A. If frequent flier miles or airline 118 vouchers are provided as part of the incentive 112, then those incentives 112 can be added to the passenger's frequent flier account with the airline 118.

After step 635, the method 235 returns to step 240.

The exemplary methods and steps described in the embodiments presented previously are illustrative, and, in alternative embodiments, certain steps can be performed in a different order, in parallel with one another, omitted entirely, and/or combined between different exemplary methods, and/or certain additional steps can be performed, without departing from the scope and spirit of the invention. For example, although the exemplary methods and steps disclosed herein largely relate to airline 118 flights, the invention can be similarly used with any mode of transportation. Additionally, the invention also can be used in other contexts beyond transportation, where tickets can be oversold or undersold, and where wait list, standby lists, or the like are used to fill remaining seats. Accordingly, such alternative embodiments are included in the invention described herein.

The invention can comprise a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention.

The invention can be used with computer hardware and software that performs the methods and processing functions described above. Specifically, in describing the functions, methods, and/or steps that the airline 118 can perform in accordance with the invention, the airline 118 can accomplish any or all of these steps by using an automated or computerized process. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A non-transitory computer-readable medium having computer-readable program code embodied therein for selecting standby passengers to board a transportation vehicle, the computer-readable program code comprising:

computer-readable instructions for receiving a standby bid from each of a plurality of standby passengers on a standby list for the transportation vehicle; and computer-readable instructions for selecting at least one standby passenger from the plurality of standby passengers to board the transportation vehicle based on the standby bid of the at least one standby passenger, wherein the transportation vehicle has a number of total seats and a number of checked-in passengers, and wherein the computer-readable instructions for selecting at least one standby passenger from the plurality of standby passengers to board the transportation vehicle based on the standby bid of the at least one standby passenger comprises:

computer-readable instructions for determining a number of available seats by subtracting the number of checked-in passengers from the number of total seats; and computer-readable instructions for repeatedly selecting a standby passenger from the plurality of standby passengers to board the transportation vehicle according to a standby passenger selection process until the number of standby passengers selected to board the transportation vehicle equals the number of available seats or until no standby passengers remain in the plurality of standby passengers, wherein the standby passenger selection process comprises:

identifying a first standby passenger from the plurality of standby passengers to board the transportation vehicle in response to a determination that the standby bid of the first standby passenger is greater than or equal to the standby bid of all other standby passengers remaining in the plurality of standby passengers;

identifying all standby passengers in the plurality of standby passengers that are traveling in a group with the first standby passenger;

determining a group size of the standby passengers traveling in the group with the first standby passenger, the group size being the number of passengers traveling in the group with the first standby passenger including the first standby passenger;

calculating a number of remaining seats by subtracting the number of standby passengers already selected to board the transportation vehicle from the number of available seats;

selecting the first standby passenger and any standby passengers traveling in the group with the first standby passenger to board the transportation vehicle in response to a determination that the group size of the standby passengers traveling in the group with the first standby passenger is less than or equal to the number of remaining seats; and removing the first standby passenger and any standby passengers traveling in the group with the first standby passenger from the plurality of standby passengers.

2. The non-transitory computer-readable medium of claim 1, wherein the computer-readable instructions for receiving a standby bid from a standby passenger on the standby list for the transportation vehicle comprises computer-readable instructions for receiving the standby bid via one of: an electronic mail message, a text message, a website interface, and a kiosk interface.

3. The non-transitory computer-readable medium of claim 1, wherein the computer-readable instructions for receiving a standby bid from a standby passenger on the standby list for the transportation vehicle comprise computer-readable instructions for receiving the standby bid from the standby passenger via a kiosk for receiving the standby bid from the standby passengers.

4. The non-transitory computer-readable medium of claim 1, wherein a standby bid is received from a standby passenger with a ticket for a second transportation vehicle, and wherein the standby bid is received from the standby passenger while the standby passenger is checking in for the second transportation vehicle.

5. The non-transitory computer-readable medium of claim 1, wherein the computer-readable program code further comprises computer-readable instructions for adjusting the standby bids from each of the plurality of standby passengers based on additional factors, wherein the additional factors comprise at least one of: a frequent flier status of the standby passenger, a fare class of the standby passenger, and a transportation class of the standby passenger.

6. The non-transitory computer-readable medium of claim 1, wherein the computer-readable program code further comprises computer-readable instructions for placing standby passengers not selected to board the transportation vehicle on a standby list for a subsequent transportation vehicle, wherein the transportation vehicle has a first destination and the subsequent transportation vehicle has a second destination, and wherein the first destination is the same as the second destination.

7. The non-transitory computer-readable medium of claim 1, wherein the computer-readable program code further comprises:

computer-readable instructions for charging each selected standby passenger a fee based on the standby bid of each selected standby passenger; and computer-readable instructions for issuing boarding passes for each selected standby passenger on the transportation vehicle.

8. The non-transitory computer-readable medium of claim 1, wherein at least one standby bid from a standby passenger on the standby list for the transportation vehicle is received via one of: an electronic mail message, a text message, a website interface, and a kiosk interface, wherein at least one standby bid is received from a standby passenger with a ticket for a second transportation vehicle while the standby passenger is checking in for the second transportation vehicle, wherein at least one standby bid received from a given standby passengers is adjusted based on additional factors comprising at least one of: a frequent flier status of the given standby passenger, a fare class of the given standby passenger, and a transportation class of the given standby passenger, wherein standby passengers not selected to board the transportation vehicle are placed on a standby list for a subsequent transportation vehicle having a destination identical to a destination of the transportation vehicle, wherein each selected standby passenger is charged a fee based on the standby bid received from each selected standby passenger, and wherein each selected standby passenger is boarded on the transportation vehicle.

9. The non-transitory computer-readable medium of claim 5, wherein the computer-readable instructions for selecting at least one standby passenger from the plurality of standby passengers to board the transportation vehicle based on the standby bid of the at least one standby passenger comprise computer-readable instructions for selecting at least one standby passenger from the plurality of standby passengers to board the transportation vehicle based on the adjusted standby bid of the at least one standby passenger.

10. A non-transitory computer-readable medium having computer-readable program code embodied therein for selecting standby passengers to board a transportation vehicle, the computer-readable program code comprising:

computer-readable instructions for receiving a standby bid for each of a plurality of standby passengers;

computer-readable instructions for placing the plurality of standby passengers on a standby list for the transportation vehicle;

computer-readable instructions for sorting the standby list based on the standby bid of each standby passenger on the standby list, thereby creating a sorted standby list, the sorted standby list having a first passenger; and computer-readable instructions for selecting which standby passengers to board the transportation vehicle based on the sorted standby list, wherein the computer-readable instructions for selecting which standby passengers to board to the transportation vehicle based on the sorted standby list comprise:

computer-readable instructions for determining a number of remaining seats on the transportation vehicle;

computer-readable instructions for identifying the first standby passenger on the sorted standby list;

computer-readable instructions for identifying a group size of the first standby passenger, the group size being equal to a number of passengers traveling in the group with the first standby passenger including the first standby passenger; and computer-readable instructions for selecting the first standby passenger and any standby passengers traveling in a group with the first standby passenger to board the transportation vehicle in response to a determination that the group size of the first standby passenger does not exceed the number of remaining seats on the transportation vehicle.

11. The non-transitory computer-readable medium of claim 10, wherein the transportation vehicle has a number of seats available for standby passengers, and
wherein the number of seats available for standby passengers and the standby bids received from standby passengers other than each respective standby passenger are inaccessible to each respective standby passenger when each respective standby bid is received from each respective standby passenger.

12. The non-transitory computer-readable medium of claim 10, wherein the computer-readable instructions for receiving a standby bid for a plurality of standby passengers comprise:
computer-readable instructions for receiving a standby bid from a given standby passenger; and
computer-readable instructions for associating the standby bid from the given standby passenger with any standby passenger traveling in a group with the given standby passenger.

13. The non-transitory computer-readable medium of claim 10 further comprising computer-readable instructions for removing the first standby passenger and any standby passengers traveling in a group with the first standby passenger from the sorted standby list.

14. The non-transitory computer-readable medium of claim 13, wherein the computer-readable instructions for receiving a standby bid for a plurality of standby passengers comprises:
computer-readable instructions for receiving a standby bid from a given standby passenger;
computer-readable instructions for associating the standby bid from the given standby passenger with any standby passenger traveling in a group with the given standby passenger; and
computer-readable instructions for adjusting the standby bid based on additional factors,
wherein the additional factors comprise at least one of: a frequent flier status of the standby passenger, a fare class of the standby passenger, and a transportation class of the standby passenger,
wherein the first passenger has an adjusted standby bid that is greater than or equal to the standby bid of every other passenger on the sorted standby list,
wherein the transportation vehicle has a number of seats available for standby passengers, and
wherein the number of seats available for standby passengers and the standby bids received from standby passengers other than each respective standby passenger are inaccessible to each respective standby passenger when each respective standby bid is received from each respective standby passenger.

15. The non-transitory computer-readable medium of claim 10, wherein the computer-readable instructions for receiving a standby bid for a plurality of standby passengers to board the transportation vehicle comprises computer-readable instructions for adjusting the standby bid based on additional factors, the additional factors comprising at least one of: a frequent flier status of the standby passenger, a fare class of the standby passenger, and a transportation class of the standby passenger.

16. The non-transitory computer-readable medium of claim 15, wherein the computer-readable instructions for sorting the standby list based on the standby bid of each standby passenger on the standby list comprises computer-readable instructions for sorting the standby list based on the adjusted standby bid of each standby passenger.

17. A computer-implemented method for selecting standby passengers to board a transportation vehicle, the method comprising:
receiving, by a computer, a standby bid from a first standby passenger;
comparing, a computer, the standby bid from the first standby passenger with standby bids received from other standby passengers;
determining, a computer, whether to select the first standby passenger to board the transportation vehicle based on the comparison and available seating on the transportation vehicle; and
issuing, by a computer, a boarding pass to the first standby passenger in response to a determination that the first standby passenger has been selected to board the transportation vehicle based on the comparison,
wherein determining whether to select the first standby passenger to board the transportation vehicle based on available seating on the transportation vehicle comprises:
determining, by a computer, a group size associated with the first standby passenger, the group size being one plus the number of standby passengers that are traveling in a group with the first standby passenger;
determining, by a computer, a number of confirmed passengers selected to board the transportation vehicle;
determining, by a computer, a number of standby passengers already selected to board the transportation vehicle;
determining, by a computer, a number of remaining seats for the transportation vehicle by subtracting the number of confirmed passengers selected to board the transportation vehicle and the number of standby passengers already selected to board the transportation vehicle from a number of total seats for the transportation vehicle; and
determining, by a computer, to select the first standby passenger to board the transportation vehicle in response to a determination that the number of remaining seats is greater than or equal to the group size associated with the first standby passenger.

18. The computer-implemented method of claim 17, wherein the standby bid of the first standby passenger is greater than or equal to the standby bids received from the other standby passengers.

19. The computer-implemented method of claim 18, wherein the step of receiving a standby bid from a first standby passenger comprises the step of associating, by a computer, the standby bid of the first passenger with each standby passenger traveling in a group with the first passenger.

20. The computer-implemented method of claim 19, wherein the step of associating the standby bid of the first passenger with each standby passenger traveling in the group with the first passenger comprises the step of associating, by a computer, the standby bid divided by the group size with each standby passenger traveling in the group with the first passenger.

* * * * *

UNITED STATES PATENT AND TRADEMARK OFFICE
CERTIFICATE OF CORRECTION

PATENT NO. : 8,050,950 B2
APPLICATION NO. : 12/221734
DATED : November 1, 2011
INVENTOR(S) : Shaun Beheruz Sethna It is certified that error appears in the above-identified patent and that said Letters Patent is hereby corrected as shown below:

Col. 16, Claim 1, line 43: Replace "comprises" with -- comprise --.

Col. 17, Claim 2, line 21: Replace "comprises" with -- comprise --.

Col. 18, Claim 8, line 9: Replace "passengers" with -- passenger --.

Col. 20, Claim 17, line 10: Insert -- by -- between "comparing," and "a computer".

Col. 20, Claim 17, line 13: Insert -- by -- between "determining," and "a computer".

Signed and Sealed this
Twentieth Day of December, 2011

David J. Kappos
*Director of the United States Patent and Trademark Office*